(12) United States Patent
Bae (10) Patent No.: US 11,953,181 B2
(45) Date of Patent: Apr. 9, 2024

(54) VEHICLE LAMP

(71) Applicant: HYUNDAI MOBIS CO., LTD., Seoul (KR)

(72) Inventor: Jong Won Bae, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/063,523

(22) Filed: Dec. 8, 2022

(65) Prior Publication Data
US 2023/0220978 A1   Jul. 13, 2023

(30) Foreign Application Priority Data
Jan. 12, 2022   (KR) .................... 10-2022-0004395

(51) Int. Cl.
- *F21V 19/00* (2006.01)
- *F21S 41/148* (2018.01)
- *F21V 15/01* (2006.01)
- *F21V 23/00* (2015.01)

(52) U.S. Cl.
CPC ........ *F21V 19/0035* (2013.01); *F21S 41/148* (2018.01); *F21V 15/01* (2013.01); *F21V 23/005* (2013.01)

(58) Field of Classification Search
CPC .... F21V 19/0035; F21V 15/01; F21V 23/005; F21V 23/006; F21S 41/148; F21S 45/47; F21S 45/00; B60Q 1/0094; B60Q 1/0483; B60Q 1/0475; B60Q 1/2649
See application file for complete search history.

(56) References Cited

U.S. PATENT DOCUMENTS

| | | | | |
|---|---|---|---|---|
| 6,543,920 B2 * | 4/2003 | Fujinami | ................ | F21S 43/50 362/546 |
| 10,538,197 B2 * | 1/2020 | Vincent | ................ | B60Q 1/0094 |
| 11,415,307 B1 * | 8/2022 | Eun | ........................ | F21V 23/009 |
| 2003/0184976 A1 * | 10/2003 | Brandenburg | ......... | H05K 5/065 361/818 |
| 2003/0227760 A1 * | 12/2003 | Albayrak | ............ | H05K 9/0026 361/800 |
| 2006/0291229 A1 * | 12/2006 | Tajima | ................... | B60Q 1/076 362/509 |
| 2007/0139904 A1 * | 6/2007 | English | ............... | H05K 9/0032 361/818 |
| 2012/0170294 A1 * | 7/2012 | Kolbe | .................... | H05K 5/061 362/459 |
| 2013/0058121 A1 * | 3/2013 | Tatara | ...................... | G10K 9/22 362/546 |
| 2014/0262473 A1 * | 9/2014 | Robinson | ............... | H05K 1/181 174/372 |

(Continued)

*Primary Examiner* — Tsion Tumebo
(74) *Attorney, Agent, or Firm* — DLA Piper LLP (US)

(57) ABSTRACT

A vehicle lamp includes a light emitting diode (LED) drive module (LDM) including a printed circuit board (PCB) on which an electronic element for driving a light source is mounted, and an electromagnetic interference (EMI) cover coupled to the PCB to surround the electronic element, and a lamp housing including a guide portion formed in a first direction such that the LDM is coupled thereto in a sliding manner and a seating portion in surface contact with a tip portion of the LDM in a coupled state, wherein a cover pressing portion that protrudes in a coupling direction of the LDM and presses the EMI cover in a second direction may be formed in the seating portion.

10 Claims, 5 Drawing Sheets

(56) References Cited

U.S. PATENT DOCUMENTS

| | | | |
|---|---|---|---|
| 2015/0211721 A1* | 7/2015 | Mornet | B60Q 1/0094 |
| | | | 362/546 |
| 2016/0167604 A1* | 6/2016 | Aida | B60Q 1/0094 |
| | | | 362/546 |
| 2017/0009954 A1* | 1/2017 | Ueno | F21S 41/39 |
| 2019/0044452 A1* | 2/2019 | Arita | H02M 1/32 |

* cited by examiner

VEHICLE LAMP

CROSS-REFERENCE TO RELATED APPLICATION

This application claims priority to and the benefit of Korean Patent Application No. 10-2022-0004395 filed on Jan. 12, 2022, the disclosure of which is incorporated herein by reference in its entirety.

BACKGROUND

Field of the Invention

The present disclosure relates to a vehicle lamp.

Discussion of Related Art

Vehicle lamps are provided with light emitting diode (LED) drive modules (LDMs) for driving LED light sources. The LDM may include a printed circuit board (PCB) on which various electronic components or the like are mounted, an electromagnetic interference (EMI) cover that protects the electronic components or the like mounted on the PCB and blocks electromagnetic waves, and a separate bracket for radiating heat of heating elements and assembling a lamp housing.

In the related art, when the PCB and the EMI cover are fixed for blocking of the electromagnetic waves and grounding, a separate fastening member such as screws should be used, and thus assembly properties are not good.

Further, since a separate bracket for assembling the lamp housing should be used, manufacturing cost increases.

Further, since a gap is generated between the PCB and the EMI cover, grounding performance is degraded.

SUMMARY OF THE INVENTION

The present disclosure is directed to providing a vehicle lamp which can increase adhesion between a printed circuit board (PCB) and an electromagnetic interference (EMI) cover of a light emitting diode (LED) drive module (LDM).

Further, the present disclosure is directed to also providing a vehicle lamp which can prevent degradation of grounding performance by suppressing occurrence of a gap between the PCB and the EMI cover of the LDM.

Further, the present disclosure is directed to also providing a vehicle lamp which can secure a reduction in manufacturing cost and improved assembly performance through simplification of a structure.

A vehicle lamp includes a light emitting diode (LED) drive module (LDM) including a printed circuit board (PCB) on which an electronic element for driving a light source is mounted, and an electromagnetic interference (EMI) cover coupled to the PCB to surround the electronic element, and a lamp housing including a guide portion formed in a first direction such that the LDM is coupled thereto in a sliding manner and a seating portion in surface contact with a tip portion of the LDM in a coupled state, wherein a cover pressing portion that protrudes in a coupling direction of the LDM and presses the EMI cover in a second direction may be formed in the seating portion.

The cover pressing portion may press an upper portion of the EMI cover toward the PCB.

The second direction may be a direction perpendicular to the first direction on a vertical cross section.

The lamp housing may be provided with a fixing rib protruding from an upper portion and a lower portion of the PCB toward the PCB and fixing the PCB.

The cover pressing portion may have an inclined structure in which a thickness thereof increases toward the seating portion.

A pressure applied to the EMI cover may increase toward the seating portion by the inclined structure.

The EMI cover may include a cover portion that covers the PCB from the top, and an extension portion extending in a direction from the cover portion toward the PCB and coupled to the PCB.

The vehicle lamp may further include a plurality of grounding portions formed in the extension portion of the EMI cover, and at least a fixing portion fixed to the PCB between the plurality of grounding portions.

The vehicle lamp may further include a wing-shaped coupling portion extending outward from the extension portion and screw-coupled to the lamp housing.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail with reference to the accompanying drawings.

However, the technical spirit of the present disclosure is not limited to some described embodiments and may be implemented in various different forms, and one or more of components may be selectively combined or substituted between the embodiments within the scope of the technical spirit of the present disclosure.

Further, unless explicitly defined and described, terms (including technical and scientific terms) used in the embodiments of the present disclosure can be interpreted in a meaning that may be generally understood by those skilled in the art to which the present disclosure pertains. Terms generally used, such as terms defined in the dictionary, may be interpreted in consideration of the meaning of the context of the related technology.

Further, terms used in the embodiments of the present disclosure are for describing the embodiments and are not intended to limit the present disclosure.

In the present specification, a singular form may include a plural form unless specifically mentioned in a phrase, and when "at least one (or one or more) of A, B, and C" is described, one or more of all combinations that may be combined with A, B, and C may be included.

Further, in the description of the components of the embodiments of the present disclosure, the terms such as first, second, A, B, (a) and (b) may be used.

These terms are not used to delimit an essence, an order or sequence, and the like of a corresponding component but used merely to distinguish the corresponding component from other component(s).

Further, when it is described that a first component is "connected" or "coupled" to a second component, the first component may be "connected" or "coupled" to the second component with a third component therebetween as well as the first component may be directly connected or coupled to the second component.

Further, when it is described that a first component is formed or disposed "above" or "below" a second component, the terms "above" and "below" include that one or more third components may be formed or arranged between the first and second components as well as the first and second components may be in direct contact with each other. Further, when the "above or below" is expressed, the "above or below" may include the meanings of a downward direction as well as an upward direction based on one component.

Hereinafter, embodiments will be described in detail with reference to the accompanying drawings, the same or corresponding components are designated by the same reference numerals regardless of the reference numerals, and the duplicated description thereof will be omitted.

Figure 1:
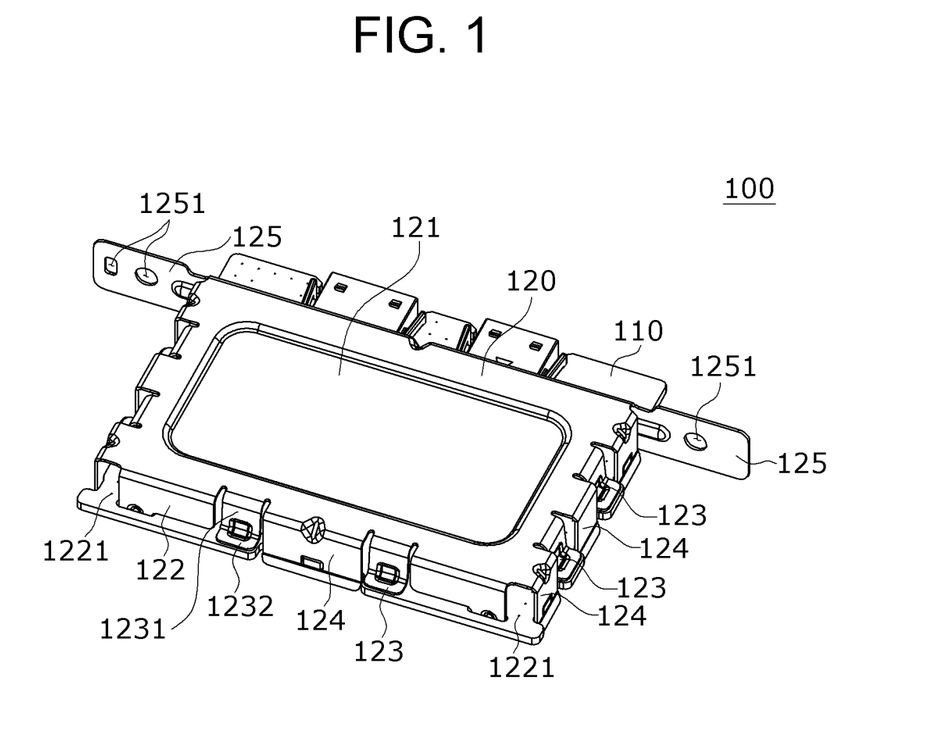
FIG. 1 is a perspective view of a light emitting diode (LED) drive module (LDM) according to an embodiment.
Figure 2:
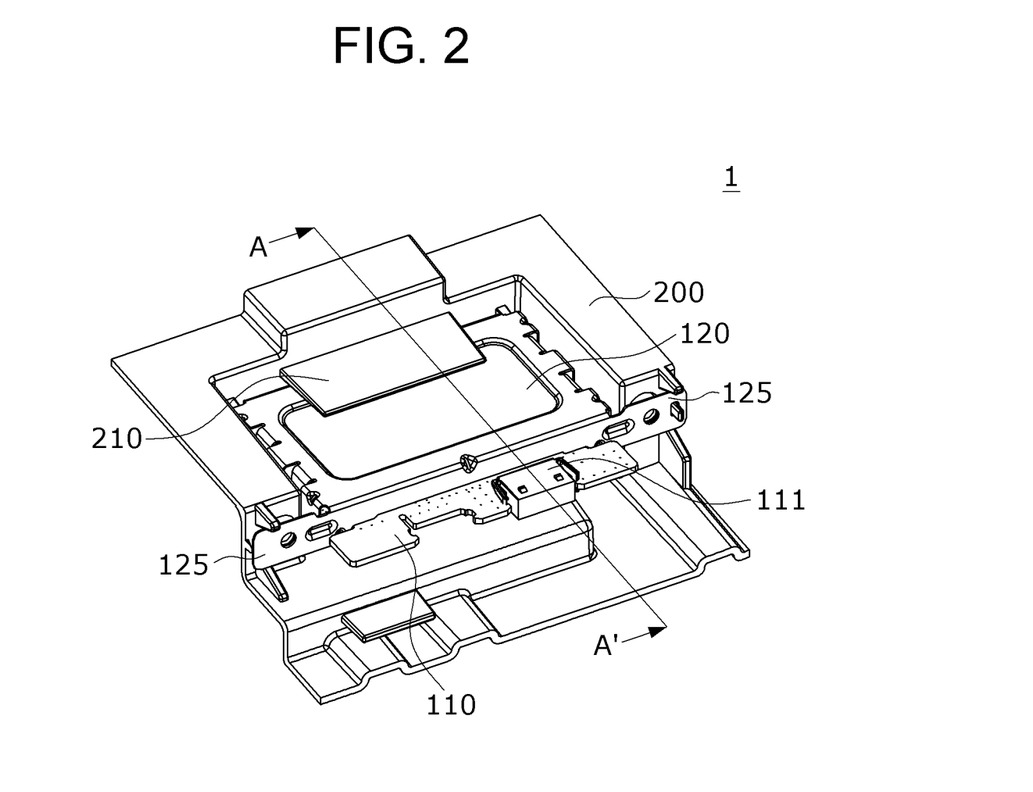
FIG. 2 is a perspective view of a vehicle lamp according to the embodiment.
Figure 3:
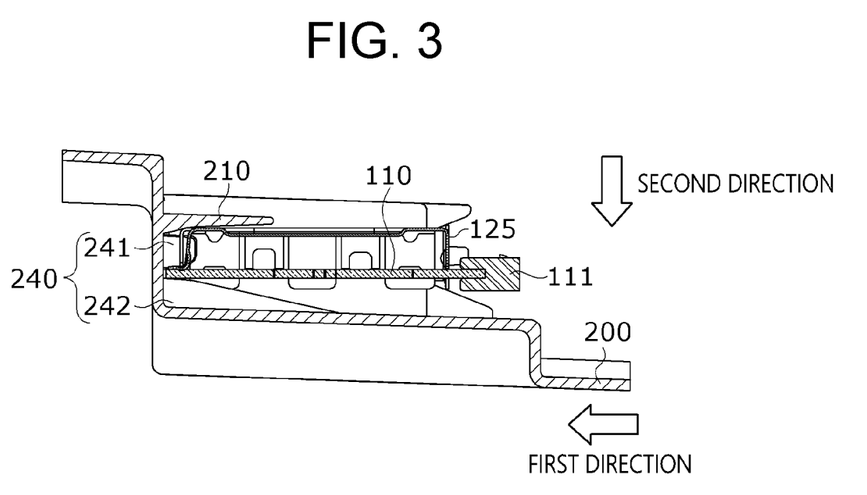
FIG. 3 is a partial cross-sectional view of the vehicle lamp according to an embodiment.
Figure 4:
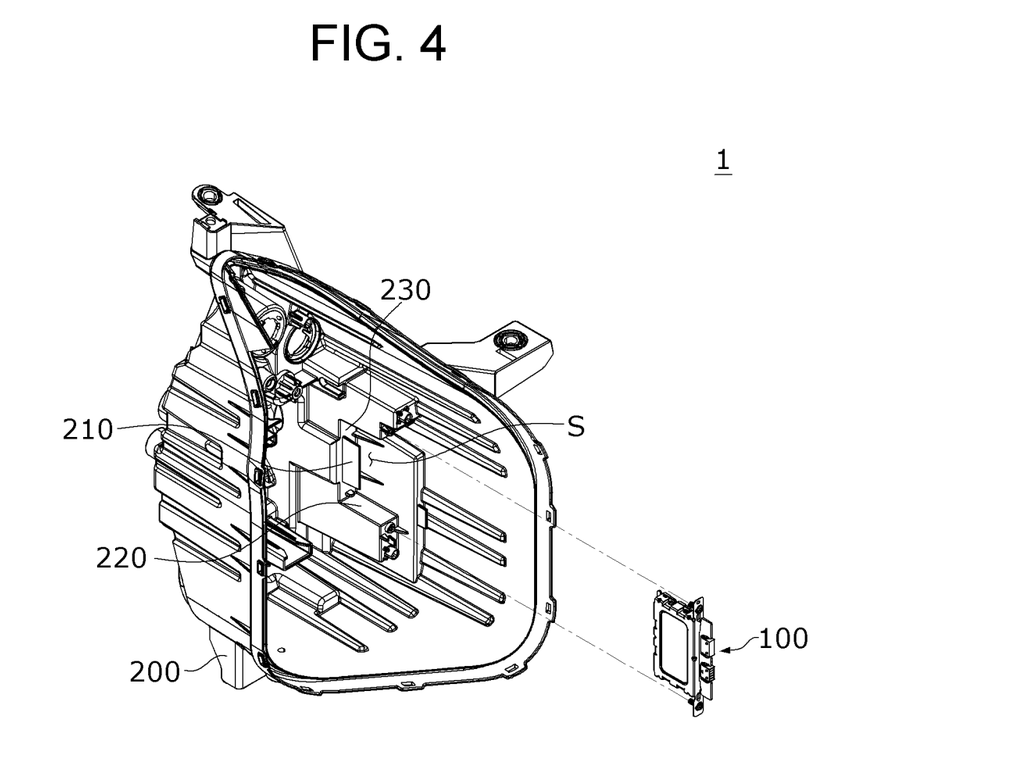
FIGS. 4 and 5 are views for describing coupling between the LDM and a lamp housing according to the embodiment.
Figure 5:
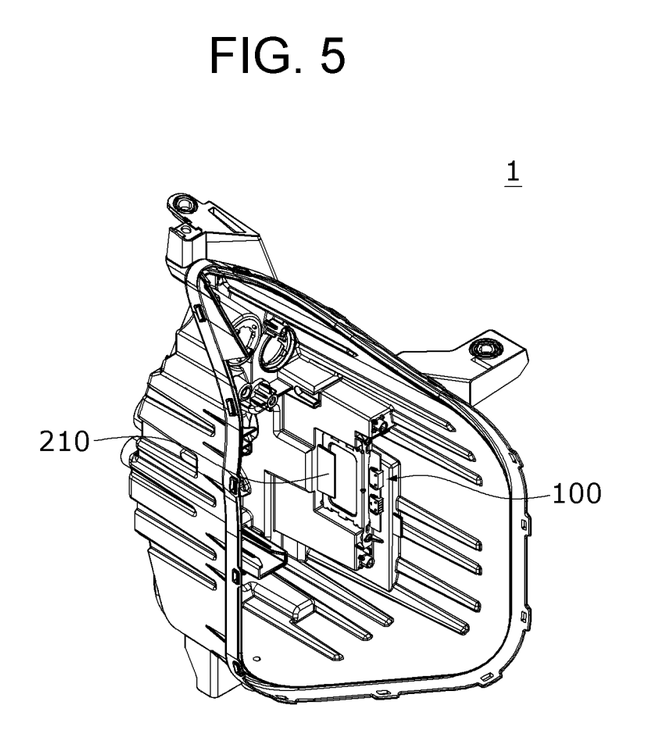

FIG. 1 is a perspective view of a light emitting diode (LED) drive module (LDM) according to an embodiment, FIG. 2 is a perspective view of a vehicle lamp according to the embodiment, FIG. 3 is a partial cross-sectional view of the vehicle lamp according to an embodiment, and FIGS. 4 and 5 are views for describing coupling between the LDM and a lamp housing according to the embodiment.

An example of a case in which a vehicle lamp 1 according to the embodiment is a head lamp providing front visibility to a driver by radiating light to the front side and forming a beam pattern when a vehicle travels in a dark environment such as night or a tunnel is described, but the present disclosure is not limited thereto, and the vehicle lamp 1 may be applied to various lamps arranged on both front and rear sides of the vehicle.

The vehicle lamp 1 may include various components such as a light source, the LDM 100, the lamp housing 200, and a lens. In the embodiment, description of additional configurations will be omitted to describe a coupling relationship between the LDM 100 and the lamp housing 200.

The LDM 100 may be operated to drive and control the light source such as an LED. The light source may be an LED element that is a semiconductor light emitting element. The LED element has been recently widely applied to the vehicle lamp because the LED element has low power consumption and excellent durability and may be operated while being mounted in a relatively miniaturized space due to a small size thereof.

Referring to FIGS. 1 to 5, the vehicle lamp 1 according to the embodiment may include the LDM 100 and the lamp housing 200.

The LDM 100 may include a printed circuit board (PCB) 110 on which an electronic element for driving a light source is mounted and an electromagnetic interference (EMI) cover 120 coupled to the PCB 110 to surround the electronic element.

A connector 111 to be electrically connected and various electronic elements may be mounted on one surface of the PCB 110. Here, when a position in which the connector 111 is mounted is referred to as a rear surface, a plurality of coupling grooves to be coupled to the EMI cover 120 may be formed on both sides and a front surface to be spaced a predetermined interval from each other along an edge. In the embodiment, the front surface may mean one surface formed on the frontmost side in a direction of being inserted into the lamp housing 200. Thereafter, in the embodiment, the front surface or a tip portion may mean a front surface with respect to the direction of being inserted into the lamp housing 200, and the rear surface or a rear end portion may mean a direction opposite thereto.

The EMI cover 120 may include a cover portion 121 that covers the PCB 110 from the top and an extension portion 122 extending in a direction from the cover portion 121 toward the PCB 110 and coupled to the PCB 110. The EMI cover 120 may have a plate shape in which a partition wall having a predetermined height is surrounded along a side thereof. A material of the EMI cover 120 may be a galvanized steel sheet of steel plate cold commercial (SPCC) material that satisfies rigidity and heat conduction performance.

The extension portion 122 of the EMI cover 120 may have a plurality of grounding portions 123 and a fixing portion 124 fixed to the PCB 110 between the plurality of grounding portions 123. For example, the fixing portion 124 may be coupled to the coupling grooves of the PCB 110 in a snap-fit type.

Two coupling grooves may be formed on side surfaces of the PCB 110 to be spaced apart from each other by a width of the grounding portion 123, and two coupling grooves may be formed on a front surface of the PCB 110 to be adjacent to each other. Thus, in the extension portion 122 of the EMI cover 120, two fixing parts 124 and two grounding portions 123 may be alternately formed on side surfaces to correspond thereto, the two fixing portions 124 may be formed on a front surface of the extension portion 122 to be adjacent to a central region, and the two grounding portions 123 may be formed on both sides of the fixing portions 124. The grounding portion 123 may include a first region extending from the cover portion 121 toward the PCB 11 and a second region 1232 extending outwardly of the PCB 110 from a distal end of the first region 1231.

The extension portion 122 of the EMI cover 120 may further include a wing-shaped coupling portion 125 extending outward and screw-coupled to the lamp housing 200. The coupling portion 125 extending in both side directions of the PCB 110 may be formed on a rear surface of the EMI cover 120 disposed on a rear surface side of the PCB 110. The coupling portion 125 may have two coupling structures extending in the form of wings from both sides of the extension portion 122 and may be screw-coupled to the lamp housing 200 because a groove 1251 is formed in each of the coupling structures.

Further, a plurality of grooves 1221 are formed in the extension portion 122 formed on a front surface of the EMI cover 120, and thus a space in which an upper fixing rib 241, which will be described below, is inserted into the EMI cover 120 may be provided. For example, the grooves 1221 of the extension portion 122 may be provided on both edges of the front surface of the EMI cover 120.

The lamp housing 200 may include a guide portion 220 formed in a first direction such that the LDM 100 is coupled thereto in a sliding manner and a seating portion 230 in surface contact with the tip portion of the LDM 100 in a coupled state. In the embodiment, the first direction may mean a direction in which the LDM 100 is inserted. The lamp housing 200 may be provided with an accommodation space S therein in which the LDM 100 is accommodated, and the guide portions 220 may be provided on both sides of the accommodation space S with respect to the LDM 100. The guide portion 220 may function to guide sliding movement of the LDM 100 while in contact with the LDM 100 when the LDM 100 is inserted.

The seating portion 230 may be formed by connecting distal ends of the guide portion 220 to extend in facing directions. The tip portion or front surface of the LDM 100 may be in surface contact with the seating portion 230 in a maximally inserted state.

A cover pressing portion 210 that protrudes in a coupling direction of the LDM 100 and presses the EMI cover 120 in a second direction may be formed in the seating portion 230. In the embodiment, the second direction may be a direction perpendicular to the first direction on a vertical cross section. That is, the second direction may mean a direction perpendicular to a direction in which the LDM 100 slides.

The cover pressing portion 210 may press an upper portion of the EMI cover 120 toward the PCB 110. That is, the cover pressing portion 210 may be in contact with an upper surface of the EMI cover 120 and press the EMI cover 120 toward the PCB 110.

The cover pressing portion 210 may have an inclined structure in which the thickness thereof increases toward the seating portion 230. Due to this inclined structure, a pressure applied to the EMI cover 120 may increase toward the seating portion 230.

Further, the lamp housing 200 may be provided with a fixing rib 240 protruding from an upper portion and a lower portion of the PCB 110 toward the PCB 110 and fixing the PCB 110. The fixing rib 240 may protrude from a front surface of the seating portion 230 in an inward direction in a longitudinal direction of the PCB 110. The fixing rib 240 may include an upper fixing rib 241 and a lower fixing rib 242. The upper fixing rib 241 and the lower fixing rib 242 may have a structure that is inclined downward in the longitudinal direction of the PCB 110. Further, the lower fixing rib 242 may protrude further than the upper fixing rib 241. The upper fixing rib 241 may be inserted into the EMI cover 120 through the grooves 1221 formed in both edges of the front extension portion 122 of the EMI cover 120 and support the PCB 110 from both sides thereof. Further, the lower fixing rib 24 may support the PCB 110 from a lower surface of the PCB 110.

Through this, when the LDM 100 slides toward the lamp housing 200, a frictional force can be minimized, and a coupling force can be increased.

In this way, in a state in which the PCB 110 and the EMI cover 120 are fixed, the PCB 110 and the EMI cover 120 may be fixed and combined so as not to escape in a front-rear direction, a left-right direction, and a vertical direction.

Further, the PCB 110 may be maintained horizontally through a structure in which the upper fixing rib 241 and the lower fixing rib 242 press the PCB 110 from an upper surface and a lower surface, and at the same time, the coupling portion 125 formed on both sides of the EMI cover 120 is coupled to the lamp housing 200.

In this case, a thermal pad may be applied to upper surfaces of some of a plurality of electronic elements mounted on the PCB 110 to form a state in close contact with an inner surface of the EMI cover 120 having excellent thermal conductivity. Thus, in a state in which the PCB 110 and the EMI cover 120 are coupled, heat generated from the PCB 110 is transferred to the EMI cover 120 through the thermal pad, thereby improving a heat radiation function.

FIG. 4 illustrates a LDM and a lamp housing before coupling, and FIG. 5 illustrates the LDM and the lamp housing after coupling. In a separation state as illustrated in FIG. 4, the LDM 100 slides along the guide portion 220 of the lamp housing 200 in the first direction and a tip portion of the LDM 100 is in surface contact with the seating portion 230. In this case, as illustrated in FIG. 5, the inclined structure of the cover pressing portion 210 at the lamp housing 200 is in close contact with the tip portion of the EMI cover 120 to press the EMI cover 120 toward the PCB 110, and thus occurrence of a gap can be suppressed, and degradation of the grounding performance can be prevented.

Further, when a subassembly to which the EMI cover 120 and the PCB 110 are coupled is assembled in the lamp housing 200 in a sliding manner, a pressure is applied in the vertical direction and the left-right direction by a structure of the fixing rib 240 and the coupling portion 125 of the PCB 110, and thus the PCB 110 can be maintained in a horizontal state.

According to the present disclosure, adhesion between a printed circuit board (PCB) and an electromagnetic interference (EMI) cover of a light emitting diode (LED) drive module (LDM) for a vehicle increases, occurrence of gap between the PCB and the EMI cover of the LDM is suppressed, and thus degradation of grounding performance can be prevented.

Further, a reduction in manufacturing cost and improved assembly performance can be secured through simplification of a structure.

Although the exemplary embodiments of the present disclosure have been described above, those skilled in the art may understand that the present disclosure may be variously modified and changed without departing from the spirit and scope of the present disclosure described in the appended claims.

What is claimed is:

1. A vehicle lamp comprising:
   a light emitting diode (LED) drive module (LDM) comprising a printed circuit board (PCB) on which an electronic element for driving a light source is mounted, and an electromagnetic interference (EMI) cover coupled to the PCB and surrounding the electronic element; and
   a lamp housing comprising a guide portion formed in a first direction such that the LDM is coupled thereto in a sliding manner and a seating portion is in contact with a tip portion of the LDM in a coupled state,
   wherein a cover pressing portion that protrudes in a coupling direction of the LDM and presses the EMI cover in a second direction different from the first direction is formed in the seating portion,
   the lamp housing being provided with a fixing rib protruding from an upper portion and a lower portion of the PCB, and
   the fixing rib comprising an upper fixing rib and a lower fixing rib that support the upper portion and the lower portion of the PCB, respectively.

2. The vehicle lamp of claim 1, wherein the cover pressing portion presses an upper portion of the EMI cover towards the PCB.

3. The vehicle lamp of claim 1, wherein the second direction is a direction perpendicular to the first direction on a vertical cross section.

4. The vehicle lamp of claim 3, wherein the first direction is a direction in which the LDM is inserted, and the second direction is a direction perpendicular to a direction in which the LDM slides.

5. The vehicle lamp of claim 1, wherein the upper fixing rib and the lower fixing rib are inclined downward in a longitudinal direction of the PCB.

6. The vehicle lamp of claim 1, wherein the cover pressing portion has an inclined structure in which a thickness thereof increases toward the seating portion.

7. The vehicle lamp of claim 6, wherein a pressure applied to the EMI cover increases toward the seating portion via the inclined structure.

8. The vehicle lamp of claim 1, wherein the EMI cover comprises a cover portion that covers a top of the PCB, and an extension portion extending in a direction from the cover portion toward the PCB.

9. The vehicle lamp of claim 8, further comprising:
   a plurality of grounding portions formed in the extension portion of the EMI cover; and
   at least a fixing portion fixed to the PCB between the plurality of grounding portions.

10. The vehicle lamp of claim 8, further comprising:
    a wing-shaped coupling portion extending outward from the extension portion and screw-coupled to the lamp housing.

* * * * *